United States Patent [19]
Angerfors

[11] Patent Number: 5,943,940
[45] Date of Patent: Aug. 31, 1999

[54] INDICATION MEANS IN A BRAKE CYLINDER FOR A VEHICLE BRAKE

[75] Inventor: Dan Angerfors, Floda, Sweden

[73] Assignee: AB Volvo, Gothenburg, Sweden

[21] Appl. No.: 09/085,825

[22] Filed: May 28, 1998

Related U.S. Application Data

[63] Continuation of application No. PCT/SE96/01572, Nov. 29, 1996.

[30] Foreign Application Priority Data

Nov. 30, 1995 [SE] Sweden .................................. 9504306
Dec. 4, 1995 [SE] Sweden .................................. 9504355

[51] Int. Cl.⁶ .................................................. F01B 25/26
[52] U.S. Cl. ................................. 92/5 R; 91/1; 91/363 R
[58] Field of Search ......................... 92/5 R; 91/1, 361, 91/363 R, 382

[56] References Cited

U.S. PATENT DOCUMENTS

| | | | |
|---|---|---|---|
| 3,572,214 | 3/1971 | Woodward | 91/363 R X |
| 3,726,191 | 4/1973 | Johnston et al. | 92/5 R |
| 4,386,552 | 6/1983 | Foxwell | 92/5 R X |
| 4,945,818 | 8/1990 | Ware | 92/5 R |
| 4,987,823 | 1/1991 | Taplin et al. | 92/5 R X |
| 5,649,469 | 7/1997 | Pierce | 92/5 R |

FOREIGN PATENT DOCUMENTS

| | | |
|---|---|---|
| 0025559 | 9/1980 | European Pat. Off. . |
| 9101292 | 4/1929 | Germany . |
| 1950443 | 10/1969 | Germany . |
| 2363268 | 12/1973 | Germany . |
| 8001370 | 7/1980 | WIPO . |
| 9612634 | 5/1996 | WIPO . |

*Primary Examiner*—Hoang Nguyen
*Attorney, Agent, or Firm*—Royston, Rayzor, Vickery, Novak & Druce, L.L.P.

[57] ABSTRACT

An indication means in a brake cylinder for a vehicle brake with a spring activated parking brake in which the brake cylinder comprises a cylinder housing (3) with a casing wall (22) and at least one gable (23). A pressure spring (5) is positioned between the piston (4) and the gable (23) of the cylinder housing for activating the parking brake by mechanically influencing the piston (4) of the brake cylinder. A bar (11) is axially displaceable relative to the release screw (1) in the throughbore (34) in the release screw (1). The bar (11) at a first end, within the cylinder housing (3), has a position sensing body (8, 16) which is axially fixed to the bar (11) and provided with a contact surface (40) for contact against the nut (7). At a second end the bar (11) has an indication body (12) which visibly protrudes out of the screw head (36) of the release screw (1) in case of axial displacement of the bar (11). This occurs due to axial displacement of the nut (7) from its outer end position, and of the contact surface (40) of the position sensing body (8, 16), which surface is in contact with the nut during rotation of the release screw (1) for mechanical release of the parking brake.

10 Claims, 2 Drawing Sheets

INDICATION MEANS IN A BRAKE CYLINDER FOR A VEHICLE BRAKE

CROSS-REFERENCES TO RELATED APPLICATIONS

This is a continuation application claiming priority to International Application Number PCT/SE96/01572 filed Nov. 29, 1996 and to Swedish Application Numbers SE9504306-3 filed Nov. 30, 1995 and SE9504355-0 filed Dec. 4, 1995, wherein said International Application claims priority to both Swedish Applications. Each of said applications are hereby expressly incorporated by reference into the present application.

FIELD OF THE INVENTION

The present invention refers to an indication means in a brake cylinder for a vehicle brake and particularly a pneumatic vehicle brake for heavy vehicles with a spring activated parking brake which, when necessary, can be released mechanically during service.

BACKGROUND OF THE INVENTION

When servicing and repairing heavy vehicles, it is possible to, when necessary, mechanically release the parking brake of the vehicle. Heavy vehicles are normally equipped with pneumatically activated brake systems, where the brakes when driving thus are activated by means of compressed air. In conventional brake systems, the parking brake is activated by letting the compressed air out of the system, thereby causing a pressure spring to actuate a piston in a brake cylinder for activation of the brake to the parking brake position. Without compressed air in the brake system the parking brake is thus normally activated.

In an earlier, common type of brake cylinder, it is possible to mechanically release the parking brake of the vehicle during service and repair of the vehicle, by unscrewing a release screw in the rear gable of the brake cylinder. This release screw, by means of a head at its one end, brings the piston with it and thereby compresses the pressure spring so that the parking brake is released and put out of function. From the safety point of view, it is of the utmost importance that service and repair personnel can carry out a visual control of the brake cylinder, in order to unambiguously determine whether the parking brake is activated or has been mechanically released, and is thus not activated. In this case, the visual control is done simply by checking whether the release screw is in its screwed out position or not, i.e. if it significantly protrudes from the gable of the brake cylinder. In this kind of brake cylinder a clear indication is thus obtained as to whether the parking brake is activated or not.

The above described protruding release screw however, has the disadvantage of demanding a relatively large free space adjacent to the gable of the brake cylinder, in order to be screwed out to its full length. Since the space available is extremely limited in the area around the wheel suspension in chassis of modern transport vehicles, another known solution is often used, where the release screw instead is axially locked in the brake cylinder and the piston is brought out by a rotationally locked, moving nut which has been screwed on to the release screw. The advantage of this solution is that the release screw stays within the brake cylinder, and thus only a screw head for the manipulation of the release screw is located outside of the brake cylinder during the entire release sequence. A serious safety problem with such a solution however, is that no external and visually observable indication of the activation status of the parking brake (i.e. function/non-function) is obtained. This fact can for example cause service personnel to mistakenly think that the parking brake is fully activated, when it in reality might be only partially activated, and in the process of letting go which might lead to unexpected and undesired movement of the vehicle with a risk for serious injuries to personnel and surrounding equipment.

SUMMARY OF THE INVENTION

The present invention solves these problem by providing an improved indication means in a brake cylinder for determining whether a parking brake is activated.

By the invention, an indication means is thus provided which gives a clear indication of the activation status of a parking brake, so that the risk of accidents during service or repair of heavy vehicles can be minimized.

In at least one embodiment, the present invention takes the form of an indication arrangement in a brake cylinder housing for signaling a released condition of an associated parking brake. The indication arrangement includes a brake cylinder housing having a casing wall and a gable. A piston is arranged for relative movement within the brake cylinder housing and a pressure spring is positioned between the brake cylinder housing and the piston. The spring is adapted for operating an associated parking brake responsively to mechanical influence upon the piston. A release screw is locked against axial movement relative to the brake cylinder housing for mechanically operating the associated parking brake. The release screw is also rotatably connected to the brake cylinder housing and has a screw head extending outside the brake cylinder housing at a first end-section and is freely longitudinally movable in the piston at a second end-section. A nut is threadedly engaged upon the release screw at the second end-section and the nut is rotationally locked within the piston. In a braking configuration of the parking brake, the nut is at an outer end position which is located at a predetermined location relative to the brake cylinder housing. The nut is arranged within the piston so that rotation of the release screw permits movement of the piston in an axial direction responsive to manipulation of the screw head. A bar is arranged in a throughbore of the release screw for relative axial displacement within that throughbore. An indication body is mounted upon the bar and arranged at the brake cylinder housing for indicating an operating condition of the associated parking brake in a manner that is depend upon the position of the nut.

The other characteristics and advantages of the invention will become obvious from the following description of a preferred embodiment.

BRIEF DESCRIPTION OF THE DRAWINGS

In the following, the invention will be described using an exemplary embodiment with reference to the appended drawings in which.

DESCRIPTION OF THE PREFERRED EMBODIMENT(S)

Figure 1:
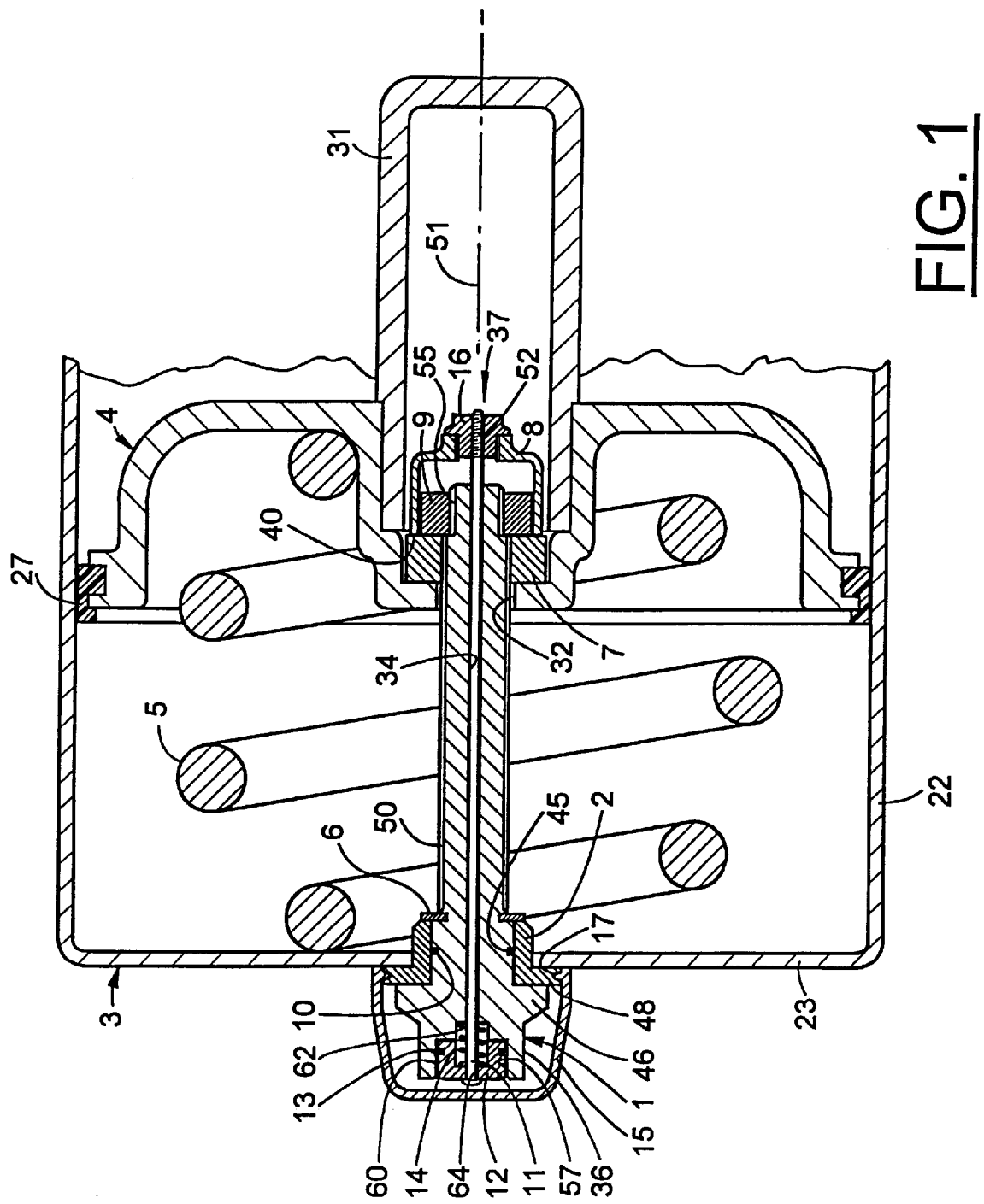
FIG. 1. shows a cross-sectional view of a brake cylinder with an indication means according to a preferred embodiment of the invention showing the parking brake in an active state.

In FIG. 1., the reference numeral 1 denotes a release screw for the mechanical release of a spring activated parking brake in a brake cylinder of a vehicle brake. The release screw 1 is provided with an indication means according to the invention, which enables an external visual observation and therefore control of whether the parking brake is activated or whether it has been mechanically released and thus, deactivated.

In the illustrated embodiment, the brake cylinder is of the pneumatic kind and is shown in a cross-sectional cut view, where the connections for compressed air have not been shown. The rest of the brake cylinder is of a well known kind, for which reason it will not be described in detail. From FIG. 1., it can be seen that the brake cylinder comprises a cylinder housing 3 having a casing wall 22 and a gable 23. A rotationally locked piston 4 is equipped with organs 31 for the activation of the brake runs inside the cylinder housing 3. The brake is not shown, but can for example be of a commonly known disc brake kind, with brake caliper and brake linings. The piston is sealed against the casing wall 22 of the cylinder housing 3 by means of a piston sealing 27 of a suitable elastic material.

A pressure spring 5, also called parking spring, of the spiral kind is positioned between the piston 4 and the gable 23 of the cylinder housing 3 in order to activate the parking brake by mechanically influencing the piston 4.

A release screw 1 for the mechanical release of the parking brake is at a first end-section rotatably mounted in the cylinder housing 3 via a liner 2. The liner 2 has been fixed to the cylinder housing 3 by pressing. An o-ring seals between the release screw 1 and the liner 2 (and thereby the cylinder housing 3) in order to achieve good protection of all internal parts of the spring brake cylinder against intrusion of moisture and dirt and accompanying corrosion. The o-ring 10 is positioned in a thread 45 which is circumferential around the release screw. The release screw 1 is axially locked against movement relative to the gable 23 of the cylinder housing 3 by means of a circumferential flange 46 and a locking ring 6, which prevents the release screw 1 from slipping out when it is not under pressure. The release screw 1 extends at said first end outside of the cylinder housing 3 in which place it has said flange 46 and a screw head 36 of, for example hexagonal shape for use of a suitable torque tool to turn the release screw 1.

The liner 2 has an outer flange 48 which is equipped with a thread 17 for snap-attachment of a protective hat 15, suitably made of plastic, which detachably covers and protects the screw head 36 and, of course, also constitutes an extra protection against the intrusion of moisture and dirt into the cylinder housing 3. The protecting hat 15 also has a further safety function which will be described later in this description. The release screw 1 extends axially through the center line of the pressure spring 5 and at a second end-section the screw 1 runs freely through a throughbore 32 in the piston 4. The release screw 1 is provided with an external thread 50 which extends along the main length of the screw.

Figure 2:
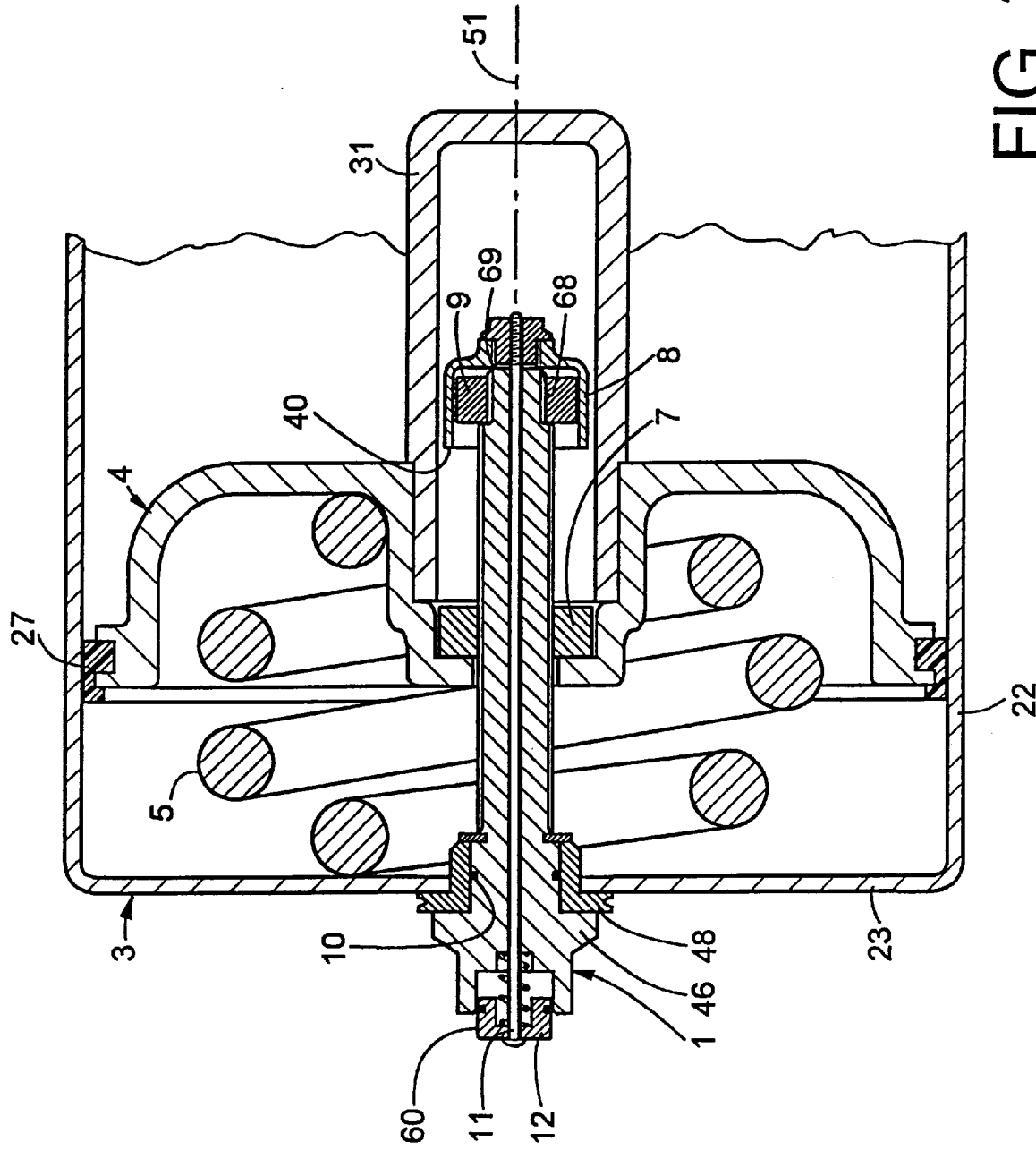
FIG. 2. shows the same cross-sectional view as FIG. 1, but the parking brake is in a partially released position, with the indication body in a protruding position.

A moving nut 7 is screwed onto said release screw 1. The nut 7 has an internal thread and on its peripheral outside is of non-round shape, in the example shown a hexagonal shape, in order to lock it rotationally in relation to the piston 4 by means of a corresponding shape in the piston 4. In FIG. 1., the nut 7 is shown in an outer end position at a set distance from the gable 23 of the cylinder housing. The moving nut 7 is arranged to, through contact with the piston 4, bring the piston with it in the axial direction of the release screw 1 when turning the release screw 1 by manipulation of the screw head 36. In so doing, the pressure spring 5 is also compressed, as can be seen in FIG. 2.

The release screw 1, according to the invention, is provided with a throughbore 34 which extends in co-parallel with the symmetry axis 51 of the screw 1. A bar 11 extends freely through the bore 34 where it is axially displaceable relative to the release screw 1. The term bar is here intended to include both solid bars and hollow pipes. The bar 11 is at a first end 37, located within the cylinder housing 3, equipped with a position sensing body, which in the embodiment shown consists of a nut 16 which has been screwed onto the bar 11 by means of a thread 52, and a hexagonal casing 8 which has been threaded onto an external thread 53 of the nut 16. The position sensing body is thus axially fixed to the bar 11. The hexagonal casing 8 which is part of the position sensing body has a circumferential contact surface 40 for contact against the nut 7, as can clearly be seen in FIG. 1. In an alternative embodiment, the hexagonal casing 8 and the nut 16 can be made in one piece. The hexagonal casing 8 is, in the example shown, locked against rotation relative to the release screw 1 by means of a hexagonal nut 9 which also serves as an end stop for the moving nut 7. The nut 9 has been threaded onto the release screw via a thread 55, which is separate from the thread 50. For the basic function of the position sensing body 8, 16, it is not, as will be described below, necessary that it be locked against rotation relative to the release screw 1.

The bar 11 is at a second end equipped with an indication body in the shape of a piston 12, arranged to visibly protrude out of the screw head 36 of the release screw 1 in case of axial displacement of the bar 11, caused by axial displacement of the nut 7 from its outer end position, and of the contact surface 40 of the hexagonal casing 16, which surface 40 is in contact with the nut 7 during rotation of the release screw 1 for mechanical release of the parking brake.

In the preferred and shown embodiment, the piston 12 is, during normal operating function of the brake cylinder, completely lowered into a surrounding recess 57 in the screw head 36. Immediately when the nut 7 leaves its outer end position the piston 12 will protrude from the recess 57. The piston 12 is preferably colored in a strong warning color, preferably red, so that service personnel will obtain a clear visual warning-signal when the parking brake has been mechanically released. The piston 12 is sealed with an o-ring 13 against the wall of the recess 57.

The contact surface 40 of the hexagonal nut 8 is here brought to move with the axial movement of the moving nut 7 through spring pressure from a spiral-spring 14 which at its one end is in contact with a seat 62 in the screw head 36 and which at its other end is in contact with the piston 12.

The bar 11 has been fitted into a hole 64 in the piston 12 with press-fitting, for which reason the piston 12, in the example shown, is locked against axial movement relative to the bar 11.

It is not possible for the protecting hat 15 to snap-attach to the thread 17 of the liner 2 if the piston 12 is in its protruding position, as shown in FIG. 2. Thus, the protective hat 15 also has an important safety-function. As well as providing protection against moisture and dirt, service personnel are not allowed to ignore an extended warning piston 12 when an attempt is made to put the protective hat back into place.

In FIG. 2, it can be seen that the hexagonal nut 8 also has contact surfaces 68 for contact against the end surface 69 of the release screw 1. In this way the axial movement of the bar 11 is limited in such a way that the indication body (the piston 12) is not permitted to entirely slip out of the recess 57 at the screw head 36.

What is claimed and desired to be secured by Letters Patent is as follows:

1. An indication arrangement in a brake cylinder housing for signaling a released condition of an associated parking brake, said indication arrangement comprising:

a brake cylinder housing having a casing wall and a gable;

a piston arranged for relative movement within said brake cylinder housing;

a pressure spring positioned between said brake cylinder housing and said piston adapted for operating an associated parking brake responsively to mechanical influence upon said piston;

a release screw locked against axial movement relative to said brake cylinder housing for mechanically operating an associated parking brake, said release screw being rotatably connected to said brake cylinder housing and having a screw head extending outside the brake cylinder housing at a first end-section and said release screw being freely longitudinally movable in said piston at a second end-section;

a nut threadedly engaged upon said release screw at said second end-section, said nut being rotationally locked within said piston and having an outer end position upon said release screw at a predetermined location relative to said brake cylinder housing, and said nut being arranged within said piston so that rotation of said release screw permits movement of said piston in an axial direction responsive to manipulation of said screw head;

a bar arranged in a throughbore of said release screw for relative axial displacement within said throughbore; and an indication body mounted upon said bar and arranged at said brake cylinder housing for indicating an operating condition of an associated parking brake dependently upon the position of the nut.

2. The indication arrangement as recited in claim 1; further comprising:

a position sensing body axially fixed to said bar and distally located upon said bar from said indication body, said position sensing body having a contact surface arranged to contact said nut when an associated parking brake is in an applied configuration.

3. The indication arrangement as recited in claim 2; wherein said contact surface of said position sensing body is urged toward contact with said nut under spring pressure.

4. The indication arrangement as recited in claim 1; wherein said indication body is arranged to indicate a released configuration of an associated parking brake by extending outside said brake cylinder housing.

5. The indication arrangement as recited in claim 4; wherein said indication body is adapted to be recessed at least partially within said screw head when an associated parking brake is in an applied configuration.

6. The indication arrangement as recited in claim 4; wherein said indication body is adapted to be recessed entirely within said screw head when an associated parking brake is in an applied configuration.

7. The indication arrangement as recited in claim 1; wherein said indication body has an exposable surface for visually indicating the status of an associated parking brake.

8. The indication arrangement as recited in claim 7; wherein said exposable surface for visually indicating the status of an associated parking brake is distinctively colored for warning of a released configuration of an associated parking brake when said indication body is extended outside said brake cylinder housing.

9. The indication arrangement as recited in claim 1; wherein said indication body is cylindrically shaped and has a substantially enveloping surface for visually indicating the status of an associated parking brake.

10. The indication arrangement as recited in claim 9; wherein said substantially enveloping surface for visually indicating the status of an associated parking brake is distinctively colored for warning of a released configuration of an associated parking brake when said indication body is extended outside said brake cylinder housing.

* * * * *